United States Patent
Cicha et al.

[11] Patent Number: 5,759,508
[45] Date of Patent: Jun. 2, 1998

[54] PROCESS FOR PRODUCING OXOCHLORIDES OF SULFUR

[75] Inventors: Walter Vladimir Cicha; Leo Ernest Manzer, both of Wilmington, Del.

[73] Assignee: E. I. du Pont de Nemours and Company, Wilmington, Del.

[21] Appl. No.: 881,233

[22] Filed: Jun. 24, 19971

Related U.S. Application Data

[60] Provisional application No. 60/022,504, Jun. 28, 1996.

[51] Int. Cl.$^6$ ............................................. C01B 17/45
[52] U.S. Cl. ............................................. 423/468; 423/467
[58] Field of Search ............................ 423/467, 468, 423/345, DIG. 9

[56] References Cited

U.S. PATENT DOCUMENTS

| | | | |
|---|---|---|---|
| 1,462,752 | 7/1923 | Jacobs | 423/468 |
| 1,765,688 | 6/1930 | McKee | 423/468 |
| 2,431,823 | 12/1947 | Pechukas | 423/468 |
| 4,231,959 | 11/1980 | Obrecht | 562/847 |
| 4,764,308 | 8/1988 | Sauer et al. | 562/847 |
| 4,914,070 | 4/1990 | Ledoux et al. | 502/178 |
| 4,978,649 | 12/1990 | Surovikin et al. | 502/416 |
| 5,136,113 | 8/1992 | Rao | 570/176 |
| 5,498,400 | 3/1996 | Hill | 423/300 |

FOREIGN PATENT DOCUMENTS

| | | |
|---|---|---|
| 6-29129 | 4/1994 | Japan. |
| WO 97/30932 | 8/1997 | WIPO. |

OTHER PUBLICATIONS

Marc. J. Ledoux et al., New Synthesis and Uses of High-Specific-Surface SiC as a Catalytic Support that is Chemically Inert and Has High Thermal Resistance, *Journal of Catalysis*, 114, 176–185, Apr. 11, 1988.

Ullmann's Encyclopedia of Industrial Chemistry 5$^{th}$ Edition, vol. A25, pp. 627–629.

*Primary Examiner*—Ngoc-Yen Nguyen

[57] ABSTRACT

A process for producing sulfuryl chloride and/or thionyl chloride is disclosed which involves contacting a mixture comprising $SO_2$ and $Cl_2$ (e.g., at about 300° C. or less) with a silicon carbide catalyst having a surface area of at least 10 $m^2 \cdot g^{-1}$.

5 Claims, No Drawings

PROCESS FOR PRODUCING OXOCHLORIDES OF SULFUR

This application claims the priority benefit of U.S. Provisional Application Ser. No. 60/022,504, filed Jun. 28,1996.

FIELD OF THE INVENTION

This invention relates to a process for the manufacture of sulfuryl chloride and/or thionyl chloride by the reaction of chlorine ($Cl_2$) with sulfur dioxide ($SO_2$) in the presence of a catalyst. More particularly, this invention relates to a process for the manufacture of sulfuryl chloride and/or thionyl chloride with minimal catalyst degradation.

BACKGROUND

The production of sulfuryl chloride by the reaction of chlorine with sulfur dioxide in the presence of a carbon catalyst is a well known process. Typically, chlorine and sulfur dioxide are dissolved in a solvent (e.g., sulfuryl chloride) before contact with a carbon catalyst (see U.S. Pat. No. 5,498,400). Thionyl chloride is typically made by treating sulfur dioxide with chlorine and sulfur dichloride in the presence of a carbon catalyst (see, e.g., Ullmann's Encyclopedia of Industrial Chemistry, 5th Edition, Vol. A25, pp. 627–629). Carbon catalysts are known to degrade during such process. Therefore, there is an interest in developing processes in which the amount of catalyst degradation is minimized.

Silicon carbide has long been known as a material which has high thermal and chemical stability, has excellent heat and electrical conducting properties and as an abrasive which is almost as hard as diamond. Silicon carbide can be commercially prepared electrochemically using the Acheson process. The product so produced has a surface area of less than 1 $m^2/g$; its use as a catalyst support has been limited partly because of this low surface area. Recently, high surface area (60 to 400 $m^2/g$) silicon carbides have been prepared (M. J. Ledoux et al., J. Catal., 114, 176–185 (1988)). These high surface area materials are used as catalyst supports or carriers.

SUMMARY OF THE INVENTION

A process for producing at least one of sulfuryl chloride and thionyl chloride is provided which comprises contacting a mixture comprising sulfur dioxide and chlorine at a temperature of about 300° C., or less, with a catalyst comprising silicon carbide and having a surface area of at least 10 $m^2 \cdot g^{-1}$.

DETAILED DESCRIPTION

In accordance with this invention, oxochloride of sulfur (i.e., $SO_2Cl_2$ and/or $SOCl_2$) is produced using a silicon carbide. The formation of $SO_2Cl_2$ is low at higher temperatures (e.g., temperatures above 100° C.).

An important aspect of the present invention relates to improving the production of sulfuryl chloride produced by contacting sulfur dioxide and chlorine. Surprisingly, we have found that silicon carbide itself can be used as a catalyst for the manufacture of sulfuryl chloride. The improvement can be employed in connection with the operating conditions used for any of the carbon-based processes previously used commercially or described in the art (e.g., those processes disclosed in U.S. Pat. No. 5,498,400 for the production of sulfuryl chloride).

Any silicon carbide-containing catalyst with a surface area greater than about 10 $m^2/g$ (e.g., about 20 $m^2/g$, or more) may be used in the process of this invention. However, silicon carbide compositions having surface areas greater than about 100 $m^2/g$, prepared by the methods disclosed in U.S. Pat. No. 4,914,070 (incorporated herein by reference) are especially preferred. A silicon content of at least about 5 weight % is preferred. More preferably the silicon content is at least about 10 weight %. Of note are embodiments where the catalyst is manufactured using a process which comprises contacting silicon monoxide with finely divided carbon (see e.g., U.S. Pat. No. 4,914,070). Use of a carbon which has an ash content of less than about 0.1 wt. % to produce the silicon carbide is preferred.

A preferred silicon carbide catalyst is prepared by a process comprising reacting vapors of silicon monoxide, SiO, on carbon by the steps of: (a) generating vapors of SiO in a first reaction zone by heating a mixture of $SiO_2$ and Si at a temperature of between 1100° C. and 1400° C., under a pressure of between 0.1 and 1.5 hPa; and (b) contacting in a second reaction zone at a temperature of between 1100° C. and 1400° C., the SiO vapors generated in said first reaction zone with finely divided reactive carbon with a specific surface area that is equal to or greater than 200 $m^2 \cdot g^{-1}$. Examples of suitable reactive carbon include graphite pellets obtained by powder agglomeration; and activated carbon such as powdered activated carbon obtained by crushing granules of activated carbon.

The silicon carbide surface area as determined by BET measurement is preferably greater than about 100 $m^2/g$ and more preferably greater than about 300 $m^2/g$.

It is known from dissociation equilibria that at 70° C., (b.p. of sulfuryl chloride at 1 atm. is 69.1° C.), about 50% of the sulfuryl chloride is dissociated into sulfur dioxide and chlorine, and that at about 120° C. the sulfuryl chloride is almost completely dissociated. Accordingly, the temperature of the sulfuryl chloride reaction is typically about 70° C., or less (e.g., in the range of from 0° C. to 70° C.). Preferably, the temperature of the process is from about 0° C. to 30° C.

The reaction is strongly exothermic. The reaction may be done in the vapor phase; more typically, the reaction is done by dissolving the chlorine and sulfur dioxide in a solvent such as carbon tetrachloride or sulfuryl chloride itself, and passing the solution over the catalyst.

We have found that carbon catalyst degradation during sulfuryl chloride production is accompanied by the production of carbon tetrachloride (formed by the reaction of chlorine with the carbon catalyst). Thus, the use of silicon carbide catalysts rather than conventional oxidizable carbon catalysts results in reducing the carbon tetrachloride formation and in increased catalyst life.

Without further elaboration, it is believed that one skilled in the art can, using the description herein, utilize the present invention to its fullest extent. The following specific embodiments are, therefore, to be construed as merely illustrative, and does not constrain the remainder of the disclosure in any way whatsoever.

EXAMPLES

General Catalyst Testing Procedure

A 1/2"(1.27 mm) O.D.×15"(381 mm) Inconel™600 nickel alloy tube containing a 100 mesh (0.015 mm) Monel™ nickel alloy screen is used as the reactor. The reactor is charged with about 8 mL of a silicon carbide catalyst. The presence of $SO_2Cl_2$ and/or $SOCl_2$ is confirmed by GC/mass spectral analysis.

General Analytical Procedure

The reactor effluent is sampled on-line with a Hewlett Packard HP 5890 gas chromatograph using a 1.05 m long, 0.25 mm I.D. column containing Restak% RTX-1 Crossbond 100% dimethyl polysiloxane. Gas chromatographic conditions are 50° C. for 10 minutes followed by temperature programming to 200° C. at a rate of 15° C./minute. The smallest amount of carbon tetrachloride that can be quantitatively identified was about 40 ppm by weight.

EXAMPLE 1

The catalyst is silicon carbide prepared in a similar manner to that described in U.S. Pat. No. 4,914,070. The reaction is run at temperatures of 30° C. and 300° C. A 1:1 molar ratio mixture of sulfur dioxide and chlorine is passed over the catalyst. At 30° C. and a 10 second contact time, the presence of $SO_2Cl_2$ is confirmed by GC/mass spec analysis and no $CCl_4$ is detected. At 300° C. and a 12 second contact time, the presence of $SOCl_2$ and a trace amount (<40 ppm by weight) of $CCl_4$ are detected by GC/mass spec analysis. No $SO_2Cl_2$ is detected.

What is claimed is:

1. A process for producing at least one of sulfuryl chloride and thionyl chloride, comprising:

contacting a mixture comprising $SO_2$ and $Cl_2$ at a temperature of about 300° C. or less with a catalyst comprising silicon carbide and having a surface area of at least 10 $m^2 \cdot g^{-1}$.

2. The process of claim 1 wherein sulfuryl chloride is produced; the surface area of the catalyst is about 20 $m^2/g$, or more; and the catalyst contact is at a temperature in the range of from 0° C. to 70° C.

3. The process of claim 2 wherein the catalyst is manufactured using a process which comprises contacting silicon monoxide with finely divided carbon.

4. The process of claim 3 wherein the carbon used to produce the silicon carbide has an ash content of less than about 0.1 wt %.

5. The process of claim 2 where the silicon carbide is obtained by (a) generating vapors of SiO in a first reaction zone by heating a mixture of $SiO_2$ and Si at a temperature of between 1100° C. and 1400° C., under a pressure of between 0.1 and 1.5 hPa; and (b) contacting in a second reaction zone at a temperature of between 1100° C. and 1400° C., the SiO vapors generated in said first reaction zone with finely divided reactive carbon with a specific surface area that is equal to or greater than 200 $m^2 \cdot g^{-1}$.

* * * * *